(12) United States Patent
Nomura et al.

(10) Patent No.: US 10,807,335 B2
(45) Date of Patent: Oct. 20, 2020

(54) BEAD CORE FORMING DEVICE

(71) Applicants: FUJI SEIKO CO., LTD., Hashima-shi, Gifu-Ken (JP); FUJI SHOJI CO., LTD., Hashima-shi, Gifu-Ken (JP)

(72) Inventors: Shigeaki Nomura, Hashima (JP); Kazuhiko Tsuboi, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 430 days.

(21) Appl. No.: 15/505,789

(22) PCT Filed: Aug. 27, 2014

(86) PCT No.: PCT/JP2014/072425
§ 371 (c)(1),
(2) Date: Feb. 22, 2017

(87) PCT Pub. No.: WO2016/030989
PCT Pub. Date: Mar. 3, 2016

(65) Prior Publication Data
US 2017/0274610 A1 Sep. 28, 2017

(51) Int. Cl.
*B29D 30/48* (2006.01)
(52) U.S. Cl.
CPC ........ *B29D 30/48* (2013.01); *B29D 2030/487* (2013.01); *B29D 2030/488* (2013.01)
(58) Field of Classification Search
CPC .............. B29D 30/48; B29D 2030/488; B29D 2030/487; B65H 81/00
(Continued)

(56) References Cited

U.S. PATENT DOCUMENTS

| 5,603,799 A | * | 2/1997 | Kolb | B29D 30/48 156/136 |
| D503,727 S | * | 4/2005 | Johnson | B29D 30/48 D15/122 |

(Continued)

FOREIGN PATENT DOCUMENTS

| CN | 101998904 A | 3/2011 | |
| JP | 06286022 A | * 10/1994 | ............. B29D 30/48 |

(Continued)

OTHER PUBLICATIONS

JPH06286021 translated to English through the auto-translate tool of ESpaceNet (Year: 2019).*

(Continued)

*Primary Examiner* — Robert C Dye
*Assistant Examiner* — Alexander D Booth
(74) *Attorney, Agent, or Firm* — Tarolli, Sundheim, Covell & Tummino LLP

(57) ABSTRACT

A bead core formation apparatus includes a former, a guide device, and a clamping device. The former includes a circumferentially extending groove around which a steel wire is wound. The guide device guides the steel wire to the former. The clamping device is coupled to the former to clamp the distal end of the steel wire. The clamping device includes a first wall and a second wall that hold the steel wire in between to clamp the steel wire. The first wall is movable between a position where the first wall is opposed to the second wall and a position where the first wall is not opposed to the second wall. The guide device includes a steel wire moving portion that moves the distal end of the steel wire from a position separated from the second wall to a position adjacent to the second wall.

3 Claims, 9 Drawing Sheets

(58) Field of Classification Search
USPC .......................................................... 156/398
See application file for complete search history.

(56) References Cited

U.S. PATENT DOCUMENTS

| | | | |
|---|---|---|---|
| D504,445 S * | 4/2005 | Johnson | B29D 30/48 |
| | | | D15/122 |
| 2011/0030835 A1 * | 2/2011 | Morisaki | B21F 37/00 |
| | | | 140/88 |

FOREIGN PATENT DOCUMENTS

| | | | | |
|---|---|---|---|---|
| JP | H06286021 | * | 10/1994 | ............. B29D 30/48 |
| JP | 10-166473 A | | 6/1998 | |
| JP | 2000-233378 A | | 8/2000 | |
| JP | 2010-173131 A | | 8/2010 | |

OTHER PUBLICATIONS

International Preliminary Report on Patentability for Application No. PCT/JP2014/072425 dated Feb. 28, 2017.
Office Action for corresponding Chinese patent application No. 201480081424.3, dated Jul. 4, 2018.
International Search Report for Application No. PCT/JP2014/072425 dated Oct. 21, 2014.

* cited by examiner

BEAD CORE FORMING DEVICE

RELATED APPLICATIONS

The present invention is a U.S. National Stage under 35 USC 371 patent application, claiming priority to Serial No. PCT/JP2014/072425, filed on 27 Aug. 2014; the entirety of which is incorporated herein by reference.

TECHNICAL FIELD

The present invention relates to a bead core formation apparatus that forms a bead core.

BACKGROUND ART

Patent document 1 describes an example of a bead core formation apparatus that is known in the art. The bead core formation apparatus forms a bead core, which is embedded in a bead of a tire.

The bead core formation apparatus includes a former, which includes a winding groove that extends in the circumferential direction so that a rubber-coated steel wire is wound around the winding groove, a guide device, which guides the steel wire to the former, and a clamping device, which is coupled to the former to clamp the distal end of the steel wire. In the bead core formation apparatus, the distal end of the steel wire is clamped when the distal end of the steel wire is guided by the guide device and inserted into a groove, which is formed in the clamping device and extends in a feeding direction of the steel wire. Then, when the former is rotated with the distal end of the steel wire clamped by the clamping device, the steel wire is wound around the winding groove of the former a number of times. This forms a bead core.

PRIOR ART DOCUMENT

Patent Document

Patent Document 1: Japanese Laid-Open Patent Publication No. 10-166473 (e.g., FIG. 5)

SUMMARY OF THE INVENTION

Problems that are to be Solved by the Invention

In the bead core formation apparatus of patent document 1, when the clamping device clamps the steel wire, the steel wire is moved in the feeding direction with the distal end of the steel wire inserted in the groove. Consequently, the distal end of the steel wire is positioned relative to the clamping device. This increases friction between the surface of the steel wire and a wall surface defining the groove and easily damages the rubber coating of the steel wire at the portion inserted in the groove.

It is an object of the present invention to provide a bead core formation apparatus that limits damage to rubber coating of a steel wire.

Means for Solving the Problems

To achieve the above object, a bead core formation apparatus of the present invention includes a former, a guide device, and a clamping device. The former includes a winding groove around which a steel wire is wound. The winding groove extends in a circumferential direction of the former. The guide device guides the steel wire to the former. The clamping device is coupled to the former to clamp the distal end of the steel wire. The clamping device includes a first wall and a second wall that hold the steel wire in between to clamp the steel wire. The first wall is movable between a position where the first wall is opposed to the second wall and a position where the first wall is not opposed to the second wall. The guide device includes a steel wire moving portion that moves the distal end of the steel wire from a position separated from the second wall to a position adjacent to the second wall.

In the bead core formation apparatus, when the first wall of the clamping device is located at the position where the first wall is not opposed to the second wall, a section adjacent to the second wall is freed. In this state, after the steel wire moving portion moves the distal end of the steel wire to the position adjacent to the second wall from the position separated from the second wall, the first wall is moved to the position where the first wall is opposed to the second wall. Consequently, the distal end of the steel wire is held between the first wall and the second wall. Thus, in the bead core formation apparatus, friction between the distal end of the steel wire and the clamping device is reduced as compared to a structure in which the distal end of the steel wire is in contact with the clamping device and moved in the feeding direction when positioning the distal end of the steel wire. This limits damage to rubber coating of the steel wire.

Effect of the Invention

The bead core formation apparatus succeeds in limiting damage to rubber coating of a steel wire.

MODES FOR CARRYING OUT THE INVENTION

A bead core formation apparatus 1 according to one embodiment will now be described.

Figure 1:
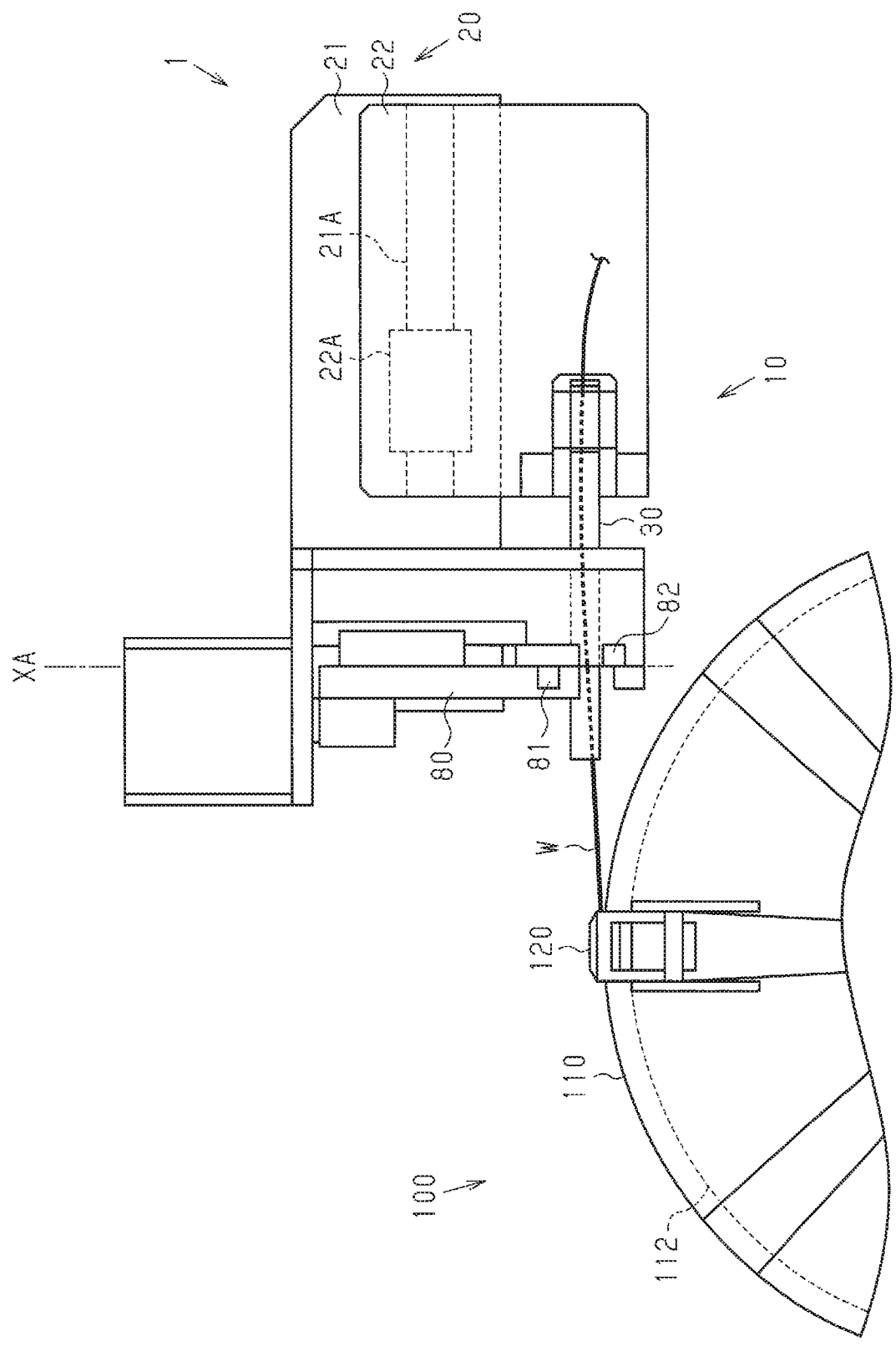
FIG. 1 is a front view of a bead core formation apparatus according to one embodiment.

As shown in FIG. 1, the bead core formation apparatus 1 includes a guide device 10, through which a rubber-coated steel wire W passes, a cutting device 80, which cuts the steel wire W, and a winding device 100, which forms a bead core by winding the steel wire W that is fed by the guide device 10. The steel wire W is bent in conformance with the diameter of a bead prior to being fed to the guide device 10 by a feeding roller (not shown).

The guide device 10 includes a device body 20 and a steel wire passing portion 30, which is one example of a steel wire moving portion.

Figure 2:
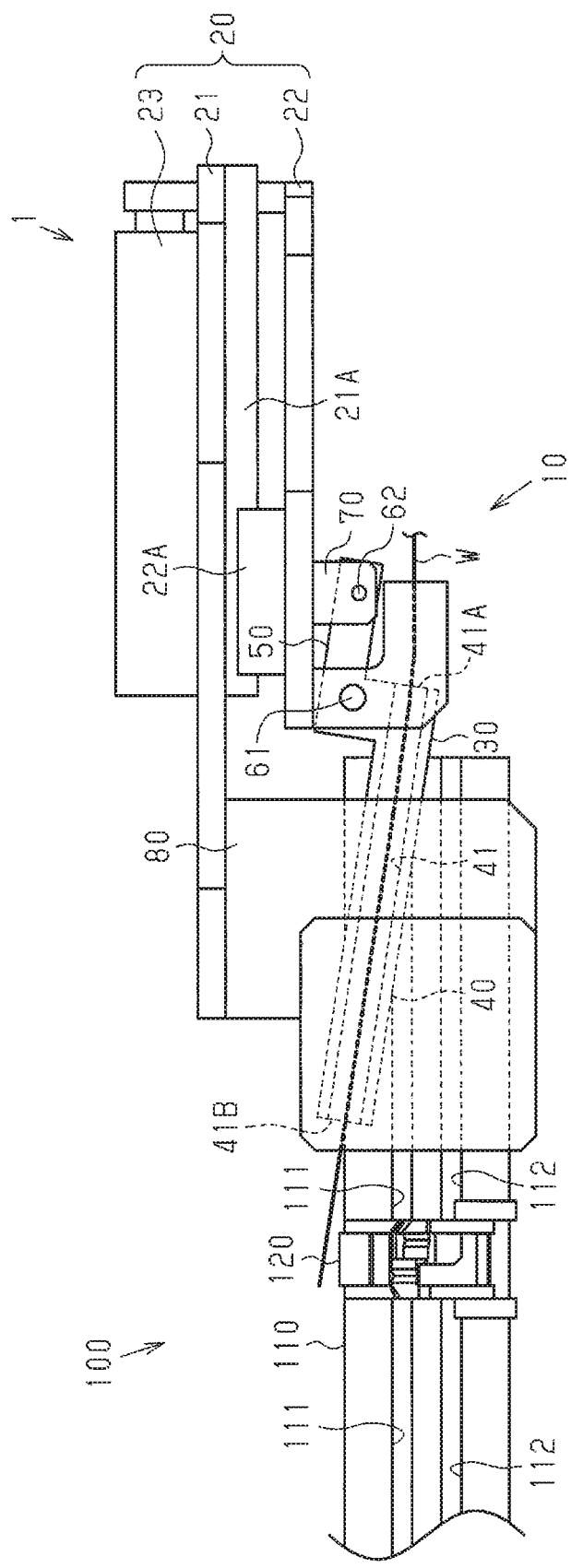
FIG. 2 is a plan view of the bead core formation apparatus shown in FIG. 1.

As shown in FIG. 2, the device body 20 includes a first support plate 21, to which the cutting device 80 is coupled, a second support plate 22, to which the steel wire passing portion 30 is coupled, and an actuator 23, which moves the second support plate 22 relative to the first support plate 21. The second support plate 22 includes a guide 22A, which is guided by a rail 21A coupled to the first support plate 21.

The steel wire W is fed to pass through the steel wire passing portion 30. The steel wire passing portion 30 is connected to a piston rod 70 of a cylinder (not shown) by a connection shaft 62. The piston rod 70 is coupled to the second support plate 22. When the cylinder drives the piston rod 70, the steel wire passing portion 30 is rotated about a rotation shaft 61.

As shown in FIG. 1, the cutting device 80 includes an upper blade 81, which is attached to be vertically movable relative to the first support plate 21, and a lower blade 82, which is fixed to the first support plate 21. The upper blade 81 and the lower blade 82 cut the steel wire W at a cutting position XA after the steel wire W is wound around the winding device 100 a number of times in correspondence with a bead core to be formed.

The winding device 100 includes a former 110, around which the fed steel wire W is wound, and a clamping device 120, which is coupled to the former 110 to clamp the distal end of the steel wire W.

As shown in FIG. 2, the former 110 has a circumferential surface that includes a first winding groove 111 and a second winding groove 112, which are arranged in an axial direction of the former 110. The first winding groove 111 and the second winding groove 112 have different cross-sectional shapes in accordance with the shapes of bead cores to be formed. The steel wire W is wound around the first winding groove 111 or the second winding groove 112 to form the corresponding bead core.

Figure 3:
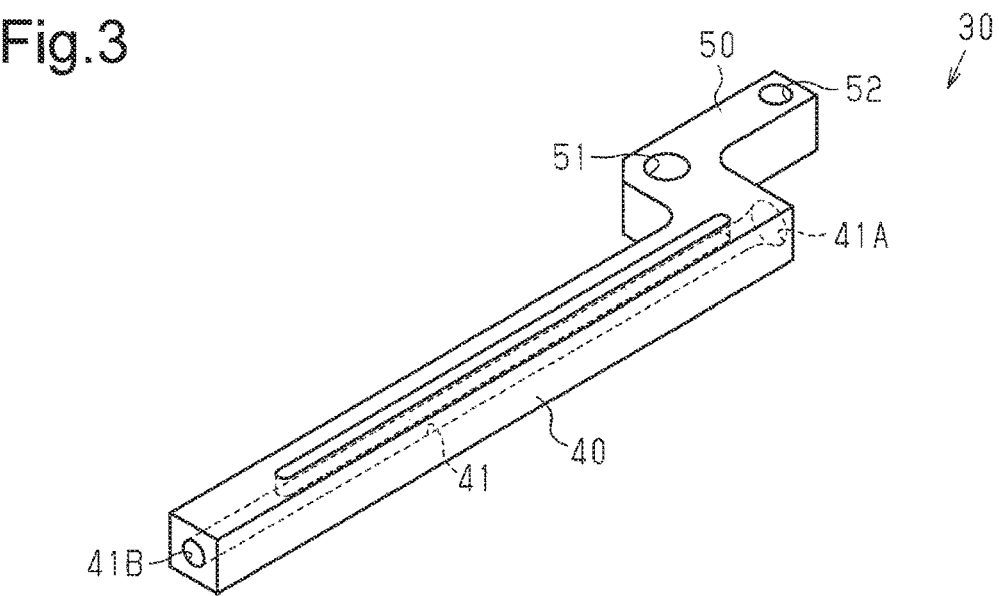
FIG. 3 is a perspective view showing a steel wire passing portion of the embodiment.

As shown in FIG. 3, the steel wire passing portion 30 includes a body 40, which includes a guideway 41 through which the steel wire W passes, and a base 50, which is continuous with the body 40.

The base 50 is continuous with the end of the body 40 located close to the inlet 41A of the guideway 41. The base 50 includes a first shaft hole 51 for the rotation shaft 61 (refer to FIG. 2), which serves as the rotation center of the steel wire passing portion 30, and a second shaft hole 52 for the connection shaft 62 (refer to FIG. 2), which connects the piston rod 70 and the steel wire passing portion 30. The first shaft hole 51 is located at a position downstream of the second shaft hole 52 in the feeding direction of the steel wire W.

The structure of the clamping device 120 will now be described with reference to FIGS. 4 to 6.

Figure 4:
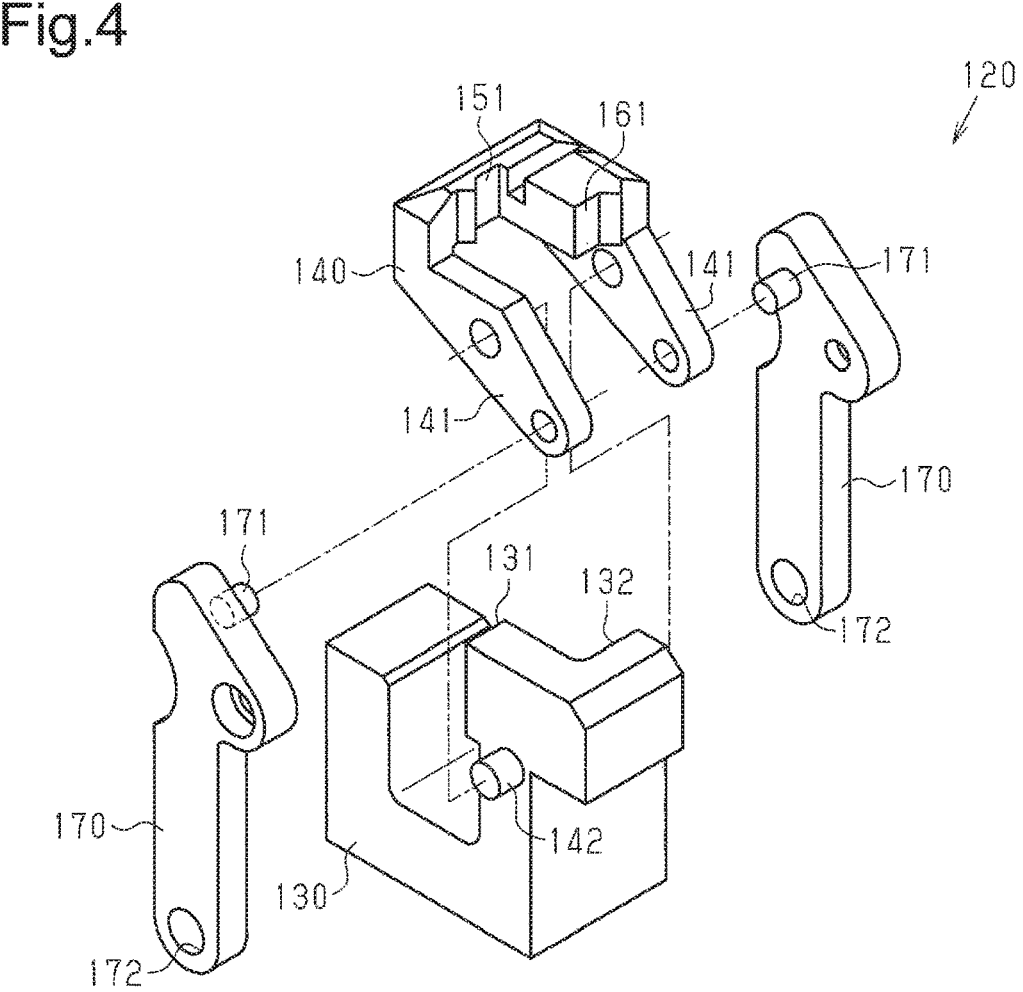
FIG. 4 is an exploded perspective view showing a clamping device of the embodiment.
Figure 5:
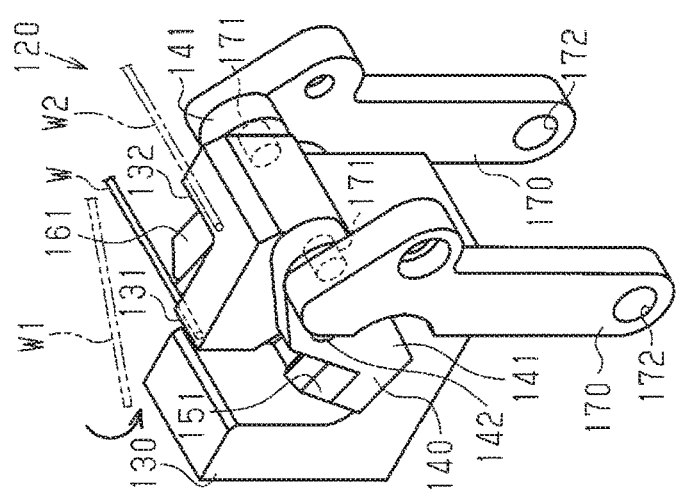
FIG. 5 is a perspective view showing the clamping device of the embodiment.
Figure 6:
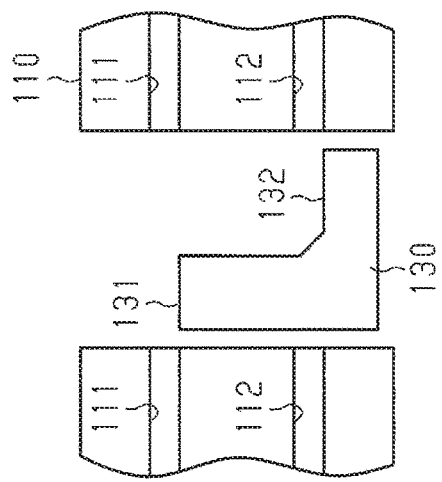
FIG. 6 is a diagram showing the relationship between first and second base walls and first and second winding grooves of the embodiment.

As shown in FIGS. 4 and 5, the clamping device 120 includes a clamp base 130, which is coupled to the former 110, a moving body 140, which is moved relative to the clamp base 130, and two moving legs 170, which are connected to the moving body 140.

The clamp base 130 includes a first base wall 131 and a second base wall 132, which are used to hold the distal end of the fed steel wire W. As shown in FIG. 6, the first base wall 131 is provided corresponding to the first winding groove 111. The second base wall 132 is provided corresponding to the second winding groove 112.

The moving body 140 includes two rotation legs 141, which are rotationally coupled to the clamp base 130 so that a portion of the clamp base 130 including the base walls 131, 132 is held between the two rotation legs 141. The rotation legs 141 are rotated about a rotation shaft 142, which is supported by the clamp base 130.

The moving body 140 includes a first clamp wall 151, which is located between the two rotation legs 141. The distal end of the steel wire W can be held between and clamped by the first clamp wall 151 and the first base wall 131 at a position corresponding to the first winding groove 111 (refer to FIG. 2).

The moving body 140 includes a second clamp wall 161, which is located between the two rotation legs 141. The distal end of the steel wire W can be held between and clamped by the second clamp wall 161 and the second base wall 132 at a position corresponding to the second winding groove 112 (refer to FIG. 2).

In the description hereafter, the position where the first clamp wall 151 or the second clamp wall 161 holds the distal end of the steel wire W, that is, the position of the moving body 140 when each clamp wall 151, 161 is opposed to the corresponding base wall 131, 132, is referred to as the clamping position. Also, the position where the first clamp wall 151 and the second clamp wall 161 do not hold the distal end of the steel wire W, that is, the position of the moving body 140 when each clamp wall 151, 161 is not opposed to the corresponding base wall 131, 132, is referred to as the non-clamping position.

Each moving leg 170 is connected to the corresponding rotation leg 141 by a connection shaft 171 so that the two rotation legs 141 are located between the two moving legs 170. Each moving leg 170 includes a hole 172. The holes 172 are rotationally connected to the distal end of an actuator (not shown).

The operation of the bead core formation apparatus 1 will now be described with reference to FIGS. 7 to 12. The former 110 is not shown in FIGS. 8 to 12.

First, the operation of the bead core formation apparatus 1 when the steel wire W is wound in the first winding groove 111 will be described.

Figure 7:
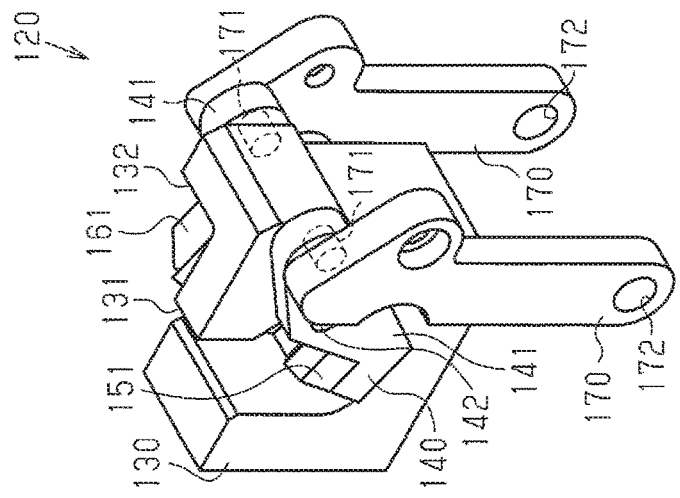
FIG. 7 is a perspective view showing the clamping device of the embodiment.

When the actuator 23 separates the second support plate 22 from the clamping device 120, the retracted piston rod 70 is moved to project from the second support plate 22. Then, the actuator 23 moves the second support plate 22 toward the clamping device 120. This moves the steel wire W, which is held by the steel wire passing portion 30 and the device body 20, to the position shown in FIG. 8. This completes the positioning of the distal end of the steel wire W. At this time, as shown in FIG. 7 with a steel wire W1 indicated by a double-dashed line, the distal end of the steel wire W is located at a position separated from the first base wall 131 and the second base wall 132.

Figure 9:
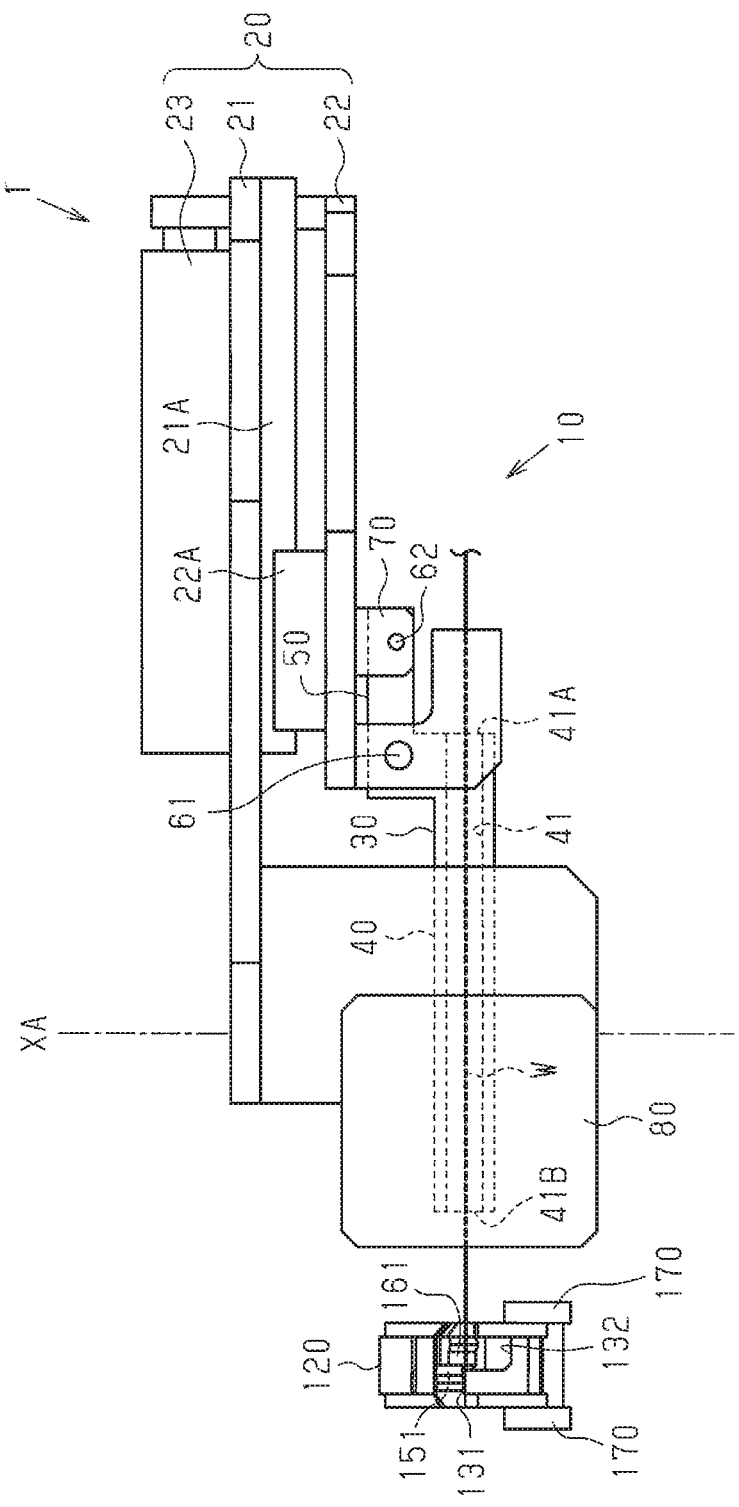
FIG. 9 is a plan view of the bead core formation apparatus when the distal end of the steel wire is located adjacent to the first base wall.

After the distal end of the steel wire W is positioned in place in the feeding direction in this manner, the piston rod 70 is retracted. This rotates the steel wire passing portion 30 about the rotation shaft 61 as shown in FIG. 9. Consequently, the distal end of the steel wire W is moved to a position adjacent to the first base wall 131 as indicated by a solid line in FIG. 7.

After the distal end of the steel wire W is moved to the position adjacent to the first base wall 131, the moving legs 170 are forced downward by the actuator (not shown). This moves the moving body 140 to the clamping position from the non-clamping position. Consequently, the first base wall 131 and the first clamp wall 151 clamp the steel wire W in between at the position corresponding to the first winding groove 111 (refer to FIG. 2). Also, the former 110 is increased in diameter.

Figure 10:
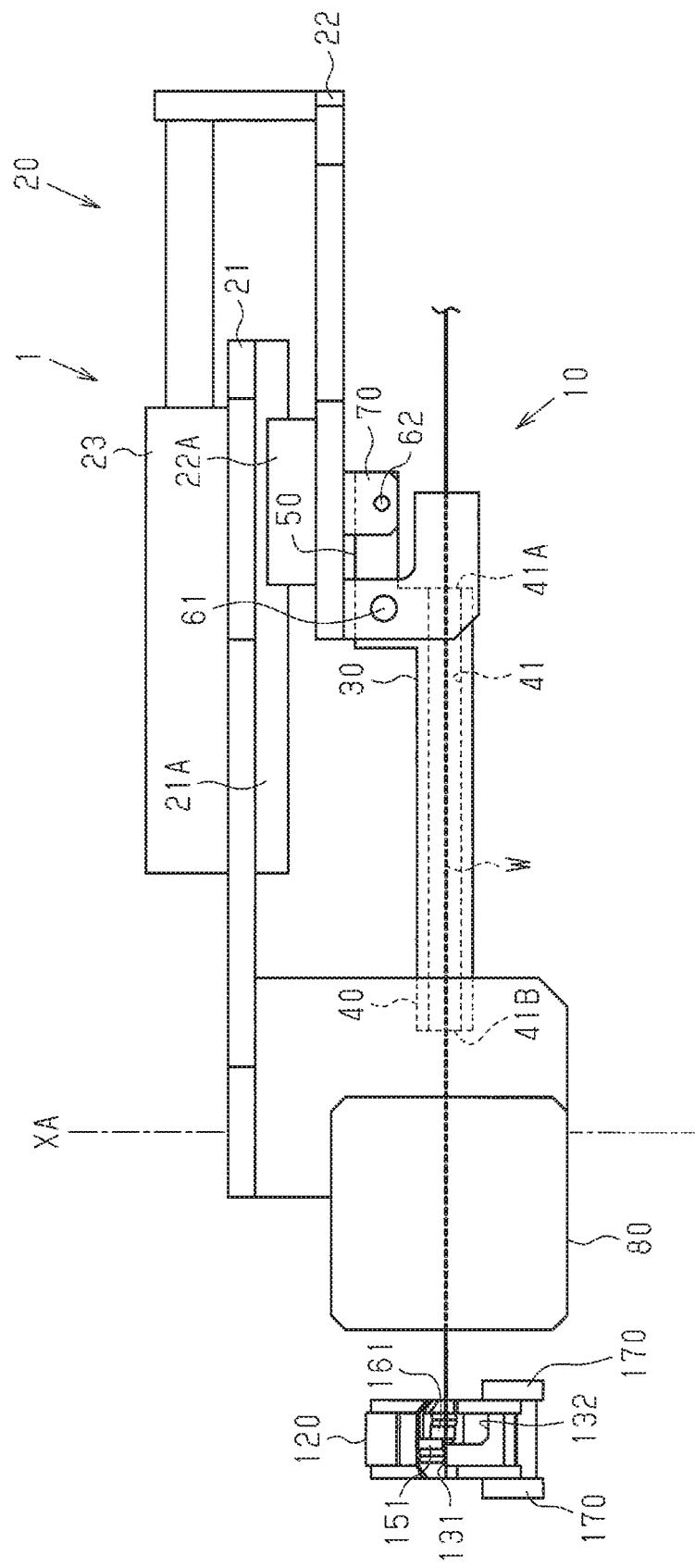
FIG. 10 is a plan view of the bead core formation apparatus when the distal end of the steel wire passing portion is moved rearward from a cutting position.

As shown in FIG. 10, when the first base wall 131 and the first clamp wall 151 clamp the steel wire W, the actuator 23 moves the second support plate 22 away from the clamping device 120. Thus, the outlet 41B of the steel wire passing portion 30 is moved rearward from the cutting position XA, which is indicated by a single-dashed line.

Then, the former 110 is rotated to wind the steel wire W around the first winding groove 111 a predetermined number of times. After the steel wire W is wound in the first winding groove 111, the cutting device 80 cuts the steel wire W. Also, the former 110 is reduced in diameter, and the moving body 140 is moved to the non-clamping position from the clamping position. This unclamps the distal end of the steel wire W from the clamping device 120, and a bead core that conforms to the shape of the first winding groove 111 is obtained.

Next, the operation of the bead core formation apparatus 1 when the steel wire W is wound in the second winding groove 112 will be described.

Figure 8:
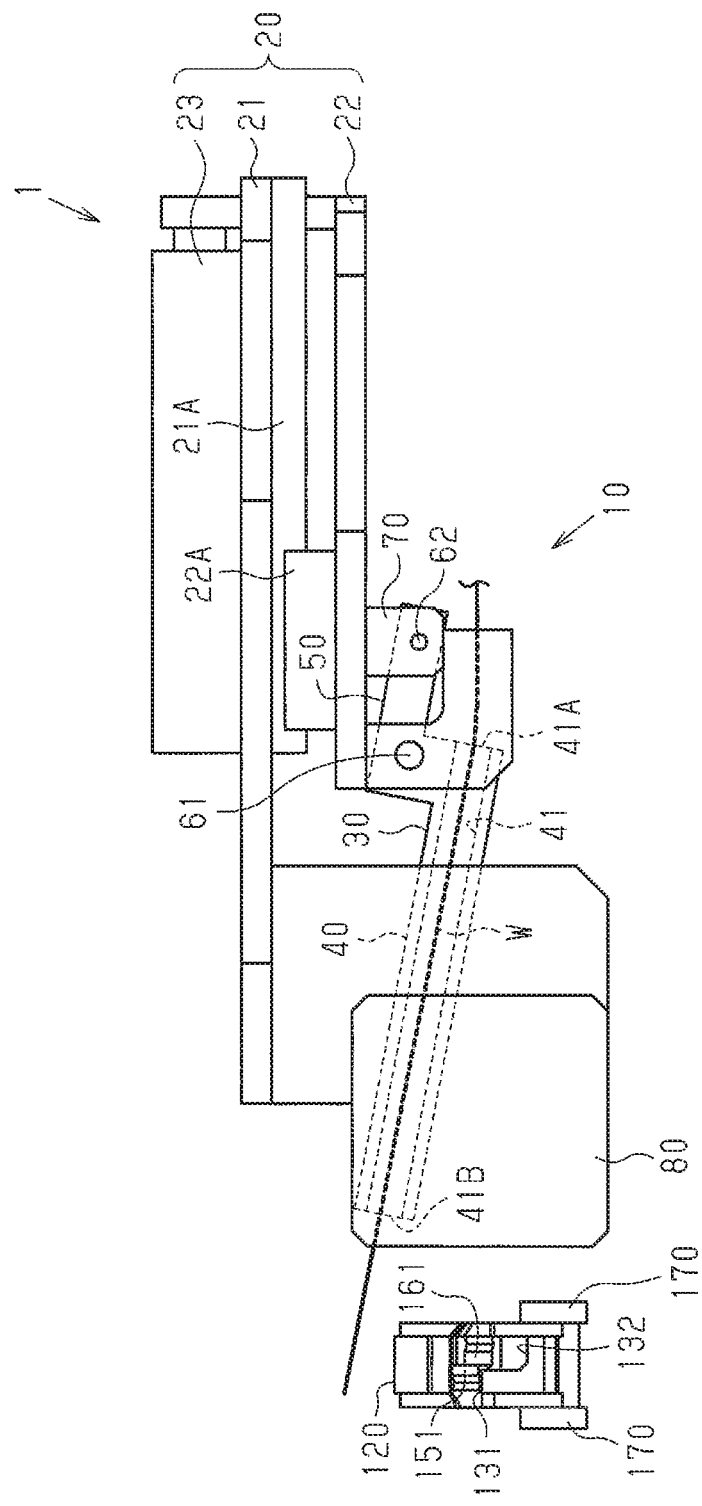
FIG. 8 is a plan view of the bead core formation apparatus of the embodiment when the steel wire passing portion is rotating the distal end of a steel wire toward the first base wall.
Figure 11:
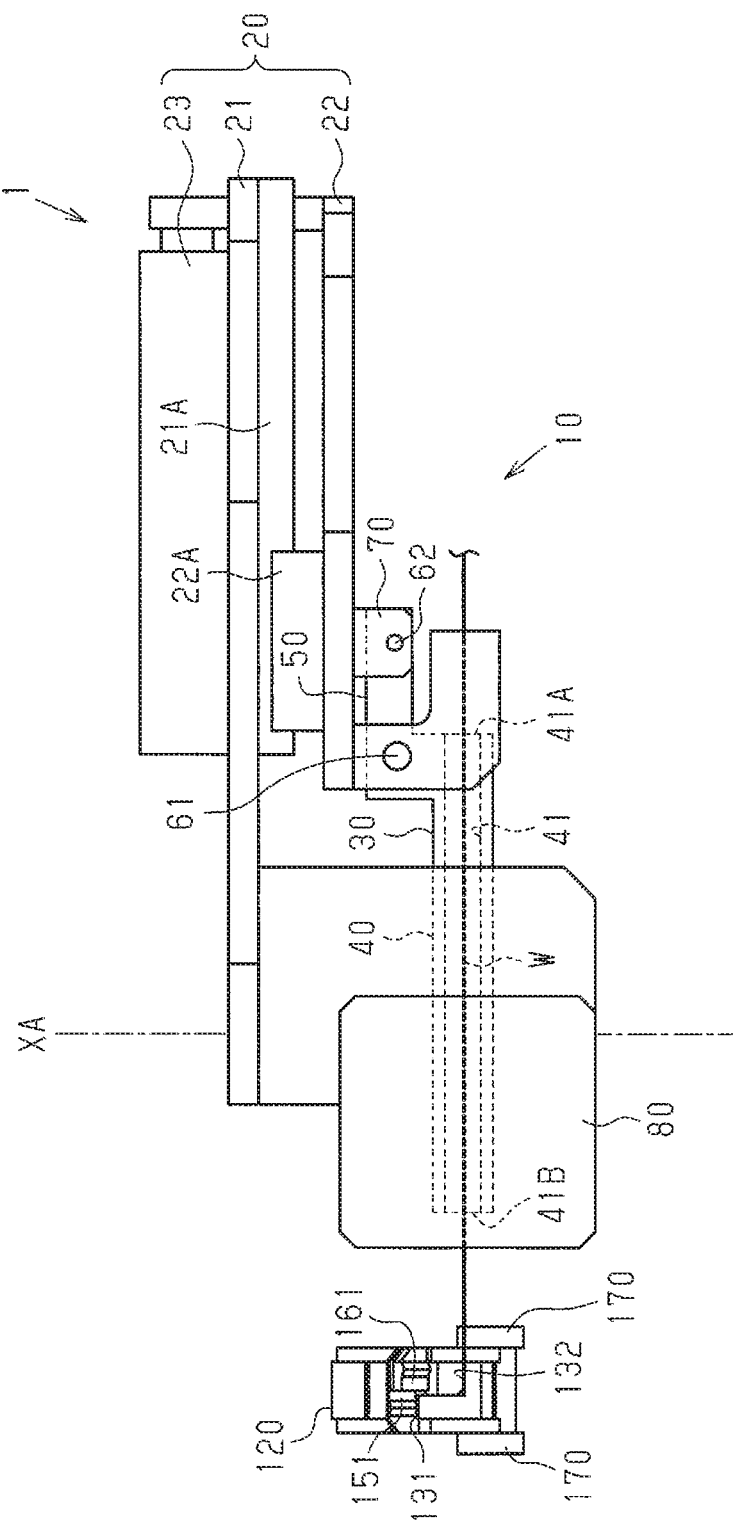
FIG. 11 is a plan view of the bead core formation apparatus when the distal end of the steel wire is located adjacent to the second base wall.

After the distal end of the steel wire W is positioned in place in the feeding direction, the piston rod 70 is retracted from the position shown in FIG. 8 to the position shown in FIG. 11. This rotates the steel wire passing portion 30 about the rotation shaft 61. Consequently, as shown in FIG. 7 with a steel wire W2 indicated by a double-dashed line, the distal end of the steel wire W is moved to a position adjacent to the second base wall 132.

After the distal end of the steel wire W is moved to the position adjacent to the second base wall 132, the moving legs 170 are forced downward by the actuator (not shown). This moves the moving body 140 to the clamping position from the non-clamping position. Consequently, the second base wall 132 and the second clamp wall 161 clamp the steel wire W in between at the position corresponding to the second winding groove 112 (refer to FIG. 2). Also, the former 110 is increased in diameter.

Figure 12:
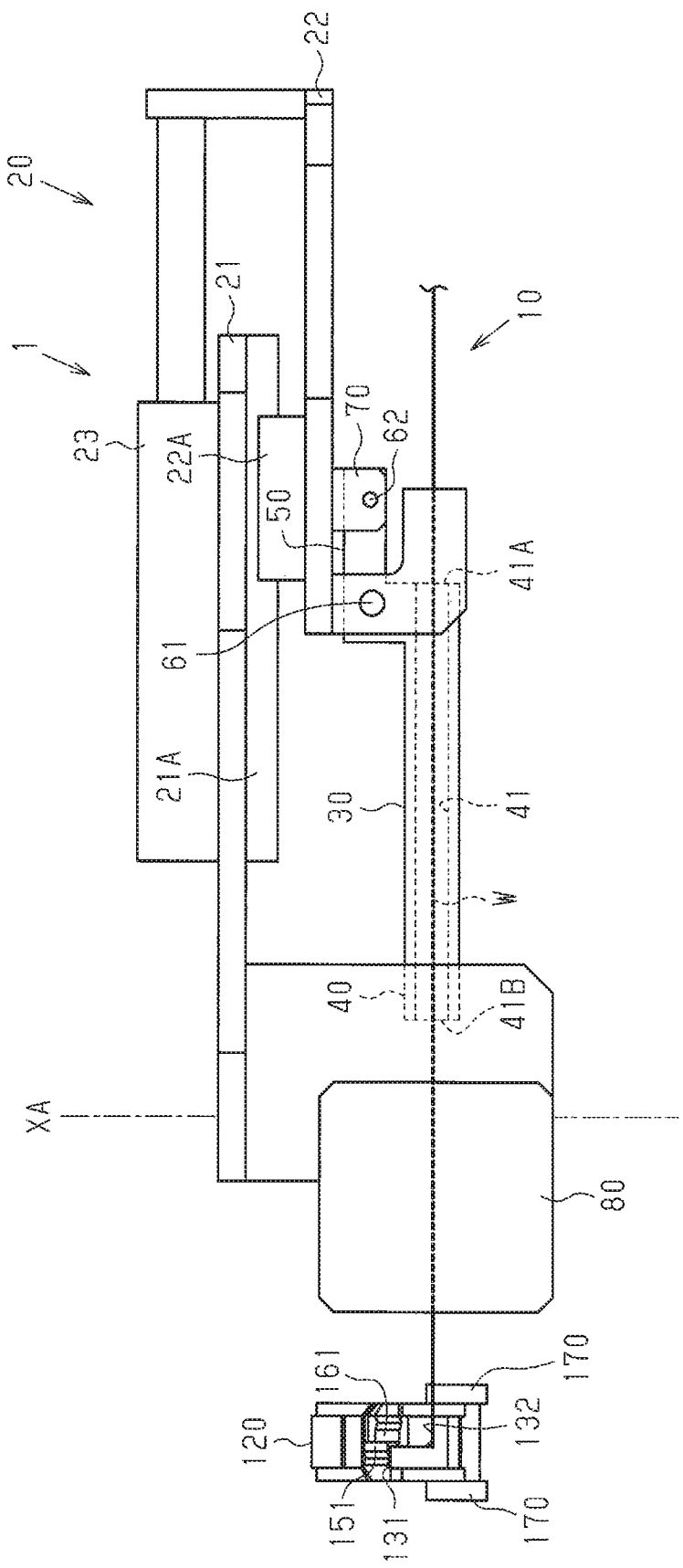
FIG. 12 is a plan view of the bead core formation apparatus when the distal end of the steel wire passing portion is moved rearward from the cutting position.

As shown in FIG. 12, when the second base wall 132 and the second clamp wall 161 clamp the steel wire W, the actuator 23 moves the second support plate 22 away from the clamping device 120. Thus, the outlet 41B of the steel wire passing portion 30 is moved rearward from the cutting position XA, which is indicated by a single-dashed line.

Then, the former 110 is rotated to wind the steel wire W around the second winding groove 112 a predetermined number of times. After the steel wire W is wound in the second winding groove 112, the cutting device 80 cuts the steel wire W. Also, the former 110 is reduced in diameter, and the moving body 140 is moved to the non-clamping position from the clamping position. This unclamps the distal end of the steel wire W from the clamping device 120, and a bead core that conforms to the shape of the second winding groove 112 is obtained.

The embodiment has the advantages described below.

(1) In the bead core formation apparatus 1, the steel wire passing portion 30 is configured to be rotated about the rotation shaft 61. This allows the distal end of the steel wire W to be moved from a position separated from the first base wall 131 to a position adjacent to the first base wall 131. Thus, when the clamping device 120 clamps the distal end of the steel wire W, the friction between the distal end of the steel wire W and the clamping device 120 is reduced compared to a structure in which the distal end of the steel wire W is in contact with the clamping device 120 and is moved in the feeding direction. This limits damage to the rubber coating of the steel wire W.

(2) The steel wire passing portion 30 includes the guideway 41, through which the steel wire W passes. Thus, rotation of the steel wire passing portion 30 about the rotation shaft 61 moves the steel wire W relative to the clamping device 120. This limits damage to the rubber coating of the steel wire W as compared to a structure in which the steel wire W is directly moved relative to the clamping device 120.

(3) The base 50 is continuous with the end of the body 40 located close to the inlet 41A of the guideway 41. This extends the rotation radius of the steel wire passing portion 30 as compared to a structure in which the base 50 is continuous with the side surface of the body 40. This increases the movement amount of the distal end of the steel wire W per unit of rotation angle.

(4) If the steel wire W is clamped by, for example, inserting the distal end of the steel wire W into a preformed groove, the steel wire W may not be appropriately inserted into the groove since the steel wire W is bent. That is, the steel wire W may not be appropriately clamped.

In this regard, in the bead core formation apparatus 1, the steel wire passing portion 30 is configured to be rotated about the rotation shaft 61. Additionally, the moving body 140 of the clamping device 120 is configured to be movable between the clamping position and the non-clamping position. Thus, after the steel wire passing portion 30 moves the distal end of the steel wire W to a position adjacent to one of the first base wall 131 and the second base wall 132, the distal end of the steel wire W is clamped by one of the first clamp wall 151 and the second clamp wall 161. This allows the bent steel wire W to be easily clamped in an appropriate manner.

The embodiment may be modified as follows.

The device body 20 may be provided with, for example, an arm that holds the steel wire W to serve as a steel wire moving portion. The arm may directly hold the distal end of the steel wire W and move the distal end of the steel wire W from a position separated from one of the base walls 131, 132 to a position adjacent to the base wall 131, 132. The steel wire moving portion may have any structure as long as the distal end of the steel wire W is moved from the position separated from the one of the base walls 131, 132 to the position adjacent to the base wall 131, 132.

The base 50 may be continuous with a portion of the body 40 corresponding to the side surface.

The first base wall 131 and the first clamp wall 151 may be omitted. Alternatively, the second base wall 132 and the second clamp wall 161 may be omitted.

DESCRIPTION OF REFERENCE CHARACTERS

1 . . . bead core formation apparatus, 10 . . . guide device, 30 . . . steel wire passing portion (steel wire moving portion), 40 . . . body, 41 . . . guideway, 41A . . . inlet, 50 . . . base,

51 . . . first shaft hole (hole), 61 . . . rotation shaft, 110 . . . former, 120 . . . clamping device, 131 . . . first base wall (second wall), 151 . . . first clamp wall (first wall).

The invention claimed is:

1. A bead core formation apparatus comprising:
   a former including a first winding groove and a second winding groove around which a steel wire is wound, wherein the first winding groove and the second winding groove extend in a circumferential direction of the former;
   a guide device that guides the steel wire to the former, the guide device including:
   a steel wire moving portion having a guideway through which the steel wire passes when the steel wire is fed to the former, the steel wire moving portion moving a distal end of the steel wire from a non-clamping position to a clamping position after the guide device is fully advanced towards the former; and
   a rotation shaft that serves as a rotation center of the steel wire moving portion;
   an actuator that moves the guide device to and from the former, the actuator fully advancing the guide device towards the former when the distal end of the steel wire is in the non-clamping position; and
   a clamping device coupled to the former, the clamping device including a first base wall, a second base wall, a first clamp wall, and a second clamp wall, wherein when the steel wire is wound around the first winding groove, the distal end of the steel wire is clamped between the first base wall and the first clamp wall, and when the steel wire is wound around the second winding groove, the distal end of the steel wire is clamped between the second base wall and the second clamp wall.

2. The bead core formation apparatus according to claim 1, wherein
   the steel wire moving portion includes a body and a base,
   the body includes the guideway,
   the base is continuous with an end of the body that is located close to an inlet of the guideway, and
   the base includes a hole into which the rotation shaft is inserted.

3. The bead core formation apparatus according to claim 1 further comprising a piston connected to the steel wire moving portion via a connection shaft, wherein when the piston is actuated the piston rotates the steel wire moving portion about the rotation shaft to move the distal end of the steel wire between the clamping position and the non-clamping position.

* * * * *